(12) United States Patent
Yamamoto

(10) Patent No.: US 8,381,901 B2
(45) Date of Patent: Feb. 26, 2013

(54) ROLLER CONVEYOR MOTORIZED ROLLER AND ROLLER CONVEYOR DEVICE USING THE SAME

(75) Inventor: Shinya Yamamoto, Kasai (JP)

(73) Assignee: Kyowa Manufacturing Co., Ltd. (JP)

( * ) Notice: Subject to any disclaimer, the term of this patent is extended or adjusted under 35 U.S.C. 154(b) by 268 days.

(21) Appl. No.: 12/992,914

(22) PCT Filed: May 16, 2008

(86) PCT No.: PCT/JP2008/059060
§ 371 (c)(1),
(2), (4) Date: Nov. 16, 2010

(87) PCT Pub. No.: WO2009/139068
PCT Pub. Date: Nov. 19, 2009

(65) Prior Publication Data
US 2011/0062000 A1 Mar. 17, 2011

(51) Int. Cl.
*B65G 13/06* (2006.01)
(52) U.S. Cl. .......................... 198/789; 198/788; 198/791
(58) Field of Classification Search .................. 198/788, 198/789, 791
See application file for complete search history.

(56) References Cited

U.S. PATENT DOCUMENTS

| | | | | |
|---|---|---|---|---|
| 4,028,086 A * | 6/1977 | Rahrig et al. | ................... | 65/273 |
| 4,167,997 A * | 9/1979 | Revells | .......................... | 198/789 |
| 5,088,596 A | 2/1992 | Agnoff | | |
| 2006/0151299 A1 * | 7/2006 | Schaefer | ....................... | 198/788 |

FOREIGN PATENT DOCUMENTS

| | | |
|---|---|---|
| CN | 2565780 | 8/2003 |
| CN | 2619911 | 6/2004 |
| JP | 4-243720 | 8/1992 |
| JP | 5-212363 | 8/1993 |
| JP | 5-306009 | 11/1993 |
| JP | 10-122252 | 5/1998 |
| JP | 11-79358 | 3/1999 |
| JP | 2001-194954 | 7/2001 |

OTHER PUBLICATIONS

Chinese Search Report.

* cited by examiner

*Primary Examiner* — Leslie A Nicholson, III
(74) *Attorney, Agent, or Firm* — Gerald E. Hespos; Michael J. Porco; Matthew Hespos

(57) ABSTRACT

A motorized conveyor roller prevents slip between a power transmission mechanism in a roller tube and the roller tube due to aging. The power transmission mechanism includes a first closed-bottom cylindrical member fit over a second closed-bottom cylindrical member and a bolt for axially pressing the members against one another. The first member receives torque from a motor and a double-sided tape is laid on an outer surface of the first member. Facing surfaces of the first and second members are tapered, and the circumferential wall with the double-sided tape is expandable diametrically. The bolt diametrically expands the circumferential wall pressed by the tapered surface. Thus, an adhesive force of the double-sided tape sandwiched between the circumferential wall and the roller tube is exerted to adhere the outer surface of the first member to an inner surface of a roller tube.

4 Claims, 11 Drawing Sheets

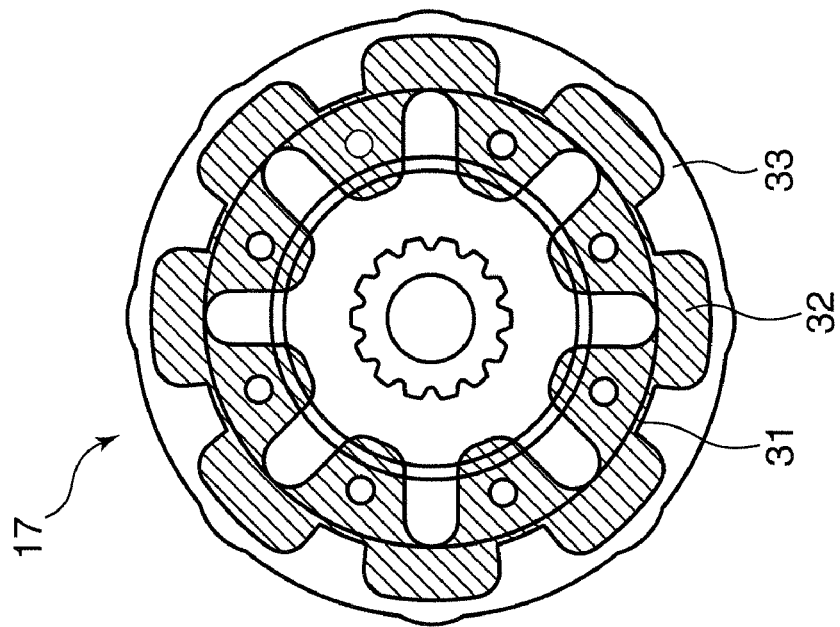
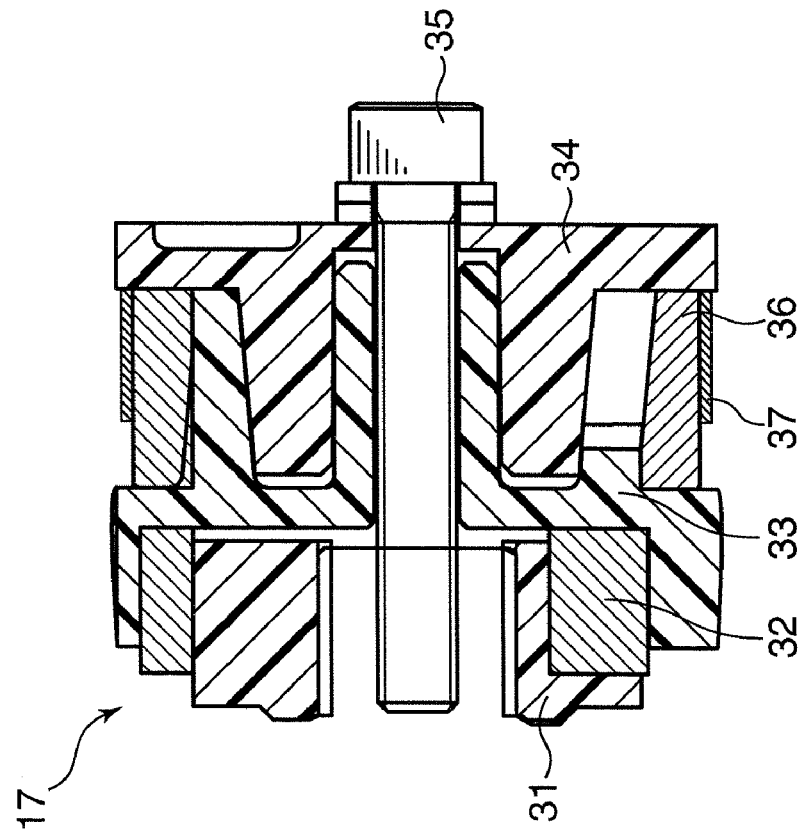

ROLLER CONVEYOR MOTORIZED ROLLER AND ROLLER CONVEYOR DEVICE USING THE SAME

BACKGROUND OF THE INVENTION

1. Field of the Invention

The present invention relates to a so-called motorized conveyor roller which is used in a roller conveyor device and which includes a built-in motor and a built-in reduction gear, and the roller conveyor device using the motorized conveyor roller.

2. Description of the Related Art

JP 3110071 describes a typical example of conventional art of the aforementioned roller conveyor motorized roller. According to the conventional art, both ends of a hollow roller tube is pivotally supported at bearings by a pair of support shafts erected so as to oppose each other from a pair of conveyor frames in order to make the roller tube rotatable with respect to the conveyor frames. In the roller tube, a motor and a power transmission mechanism such as a gear reducer are fixed to one of the support shafts. An output of the power transmission mechanism is transmitted from a drive plate that is fitted into an inner circumferential surface of the roller tube to the roller tube. In addition, the drive plate comprises two disks having flanges, and the two disks are combined with each other to form a groove in an outer circumferential portion of the drive plate. An elastic ring is fitted into the groove, and by tightening the two disks, the elastic ring whose diameter has been expanded comes into frictional contact with the inner circumferential surface of the roller tube to transmit torque.

The conventional art described above has a problem in that hardening of the elastic ring or loosening of the tightened disks due to aging or the like causes a positional displacement (slip) between the power transmission mechanism and the roller tube.

SUMMARY OF THE INVENTION

It is an object of the present invention to provide a roller conveyor motorized roller, wherein a positional displacement (slip) between a power transmission mechanism and a roller tube can be prevented, and a roller conveyor device using the roller conveyor roller.

In order to achieve the object described above, in a roller conveyor motorized roller according to the present invention, a power transmission mechanism comprises first and second members which are respectively formed in a closed-bottom cylindrical shape and one of which is fitted into the other of which, a screwing member for axially pressing the second member against the first member that receives torque from an output shaft of a motor, and a pressure-sensitive adhesive layer laid on an outer circumferential surface of a circumferential wall of the member to be positioned on an outer circumferential side among the first and second members one of which is fitted into the other of which, wherein at least one of surfaces, which face each other, of circumferential walls of the first and second members is formed in a tapered shape, the circumferential wall where the pressure-sensitive adhesive layer is laid is formed so as to be expandable in diameter, the diameter of the circumferential wall pressed by the tapered surface due to pressing by the screwing member expands, and an adhesive force of the pressure-sensitive adhesive layer is exerted to adhere the outer circumferential surface of the first member or the second member and an inner circumferential surface of the roller tube to each other.

Consequently, a positional displacement (slip) due to aging or the like can be prevented by using adhesion provided by a pressure-sensitive adhesive layer when coupling a power transmission mechanism in a roller tube with the roller tube. In addition, since the use of the pressure-sensitive adhesive layer keeps adhesive force from being exerted until the power transmission mechanism is housed in the roller tube and the second member is screwed to the first member, assembly can be easily performed and the outer circumferential surface of the first or second member on which the pressure-sensitive adhesive layer is laid can be formed to the full extent of an inner diameter of the roller tube so as to reliably prevent the positional displacement (slip).

BRIEF DESCRIPTION OF THE DRAWINGS

FIG. 6 is a diagram illustrating an enlargement of the power transmission mechanism, in which A is an axial cross-sectional view and B is a side view in a direction perpendicular to the axis.

DETAILED DESCRIPTION OF THE PREFERRED EMBODIMENTS

Figure 1:
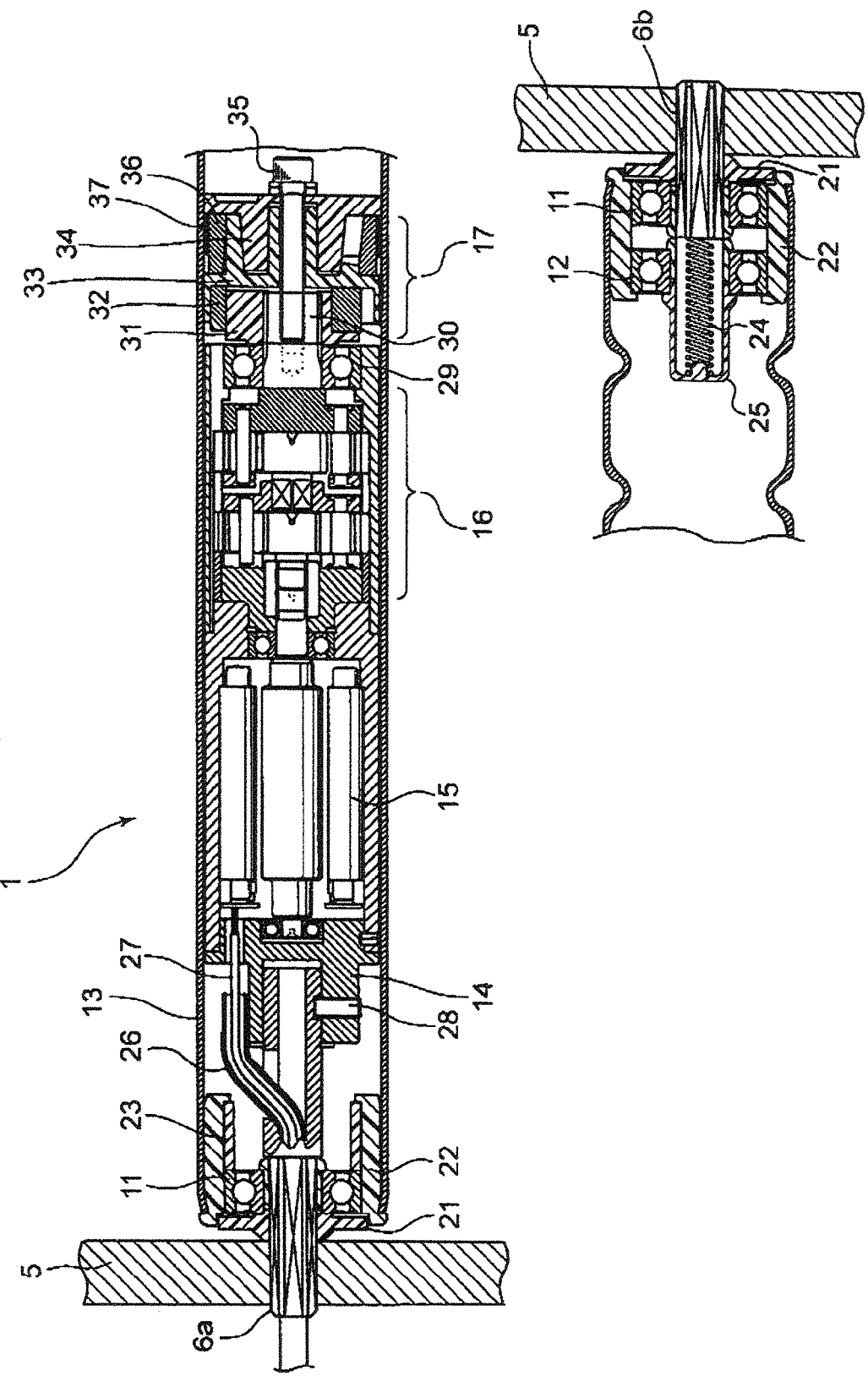
FIG. 1 is a cross-sectional view for explaining a structure of a motorized roller according to an embodiment of the present invention.
Figure 2:
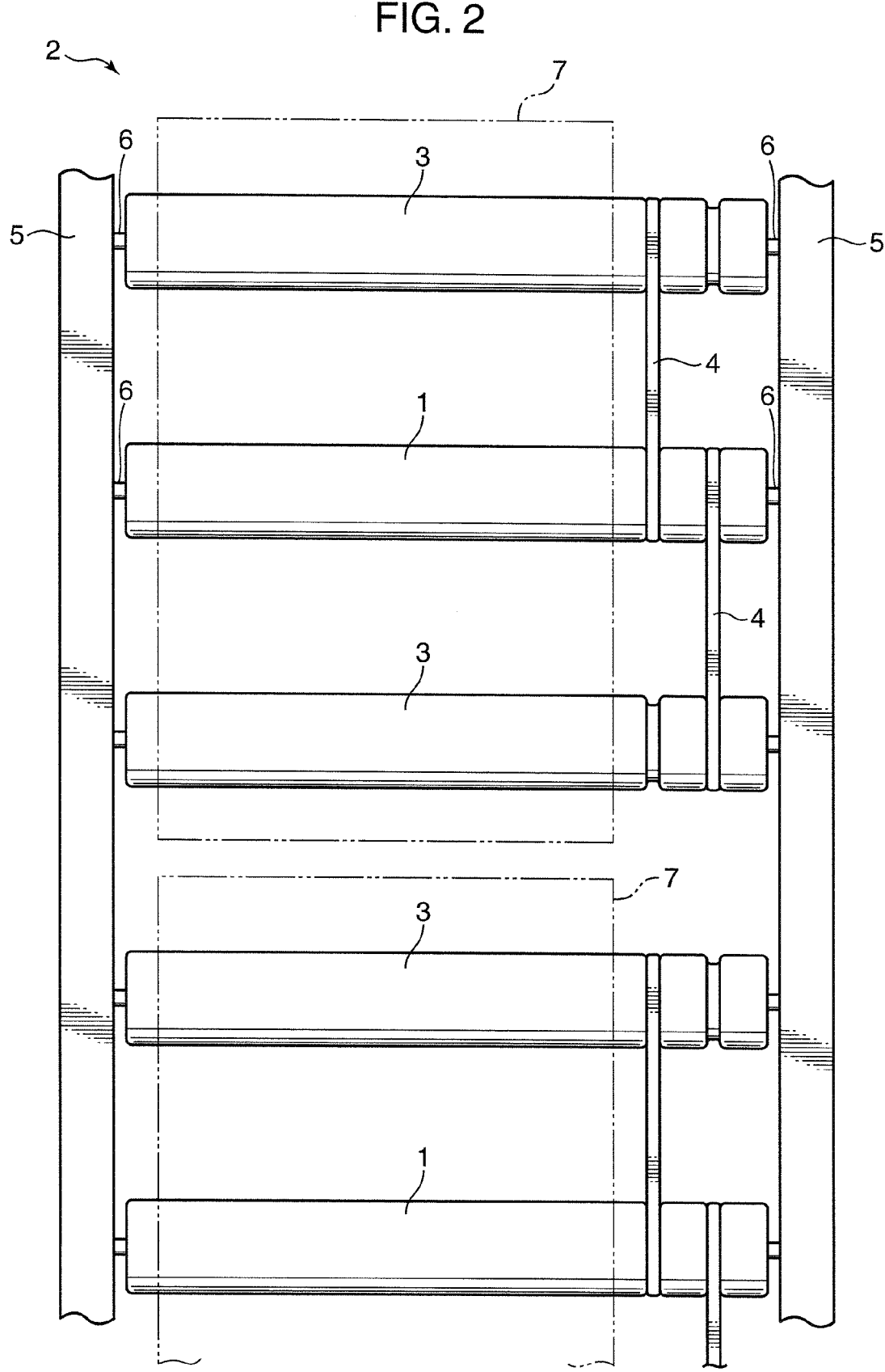
FIG. 2 is a plan view of a roller conveyor device using the motorized roller illustrated in FIG. 1.

FIG. 1 is a cross-sectional view for explaining a structure of a motorized roller 1 according to an embodiment of the present invention, and FIG. 2 is a plan view of a roller conveyor device 2 using the motorized roller 1. In FIGS. 1 and 2, the motorized roller 1 is a drive roller used every predetermined number of rollers (in FIG. 2, every three rollers) in a conveying direction in the roller conveyor device 2. The motorized roller 1 is coupled to remaining rollers 3 which become driven rollers by a belt 4 wrapped around one end of the motorized roller 1. The rollers 1 and 3 are pivotally supported so as to be rotatable by a pair of support shafts 6 (6a and 6b) erected so as to oppose each other from a pair of conveyor frames 5. Consequently, rotary torque of the motorized roller 1 is also transmitted to the remaining rollers 3 to enable a work 7 mounted on the rollers 1 and 3 to be conveyed.

Referring now to FIG. 1, the motorized roller 1 roughly comprises a roller tube 13 having both ends thereof rotatable with respect to the conveyor frames 5 by being pivotally supported on the pair of support shafts 6 by the bearings 11 and 12 at, an internal frame 14 fixed to one of the support shafts 6a in the roller tube 13, a motor 15 and a reduction mechanism 16 mounted on the internal frame 14, and a power transmission mechanism 17 which is provided in the roller tube 13 and which transmits torque of the motor 15 to the roller tube 13.

The portions supported by the bearings 11 and 12 comprise a bearing cover 21 and a side plate 22. The bearing cover 21 illustrated in FIG. 3 is fitted into inner circumferential portions of the bearings 11 and 12, the side plate 22 illustrated in FIG. 4 is fitted into outer circumferential portions of the bearings 11 and 12, and the support shafts 6a and 6b are fitted into the bearing cover 21. Subsequently, the roller tube 13 is fitted into an outer circumferential portion of the side plate 22 and both ends of the roller tube 13 are swaged.

Figure 3A:
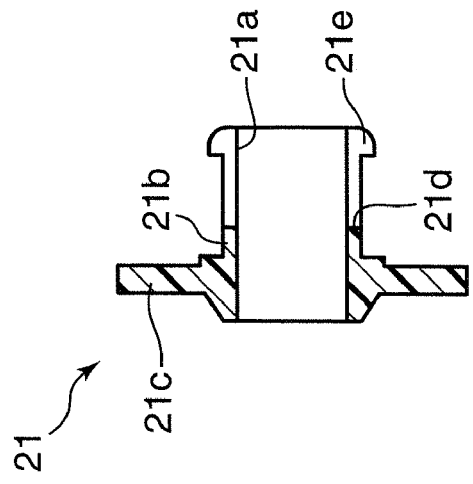
FIG. 3 is a diagram illustrating a structure of a bearing cover, in which A is an axial cross-sectional view, and B and C are side views in a direction perpendicular to the axis.
Figure 3B:
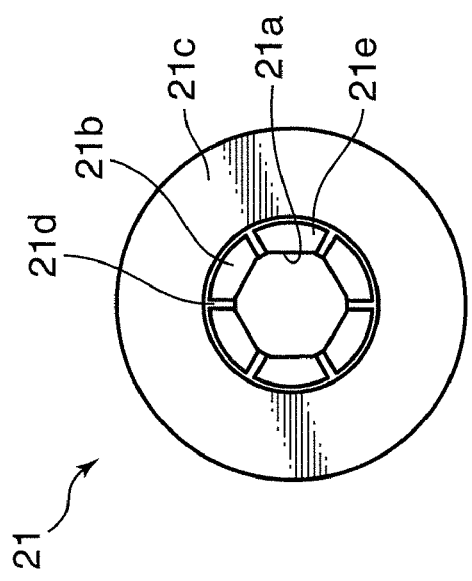
Figure 3C:
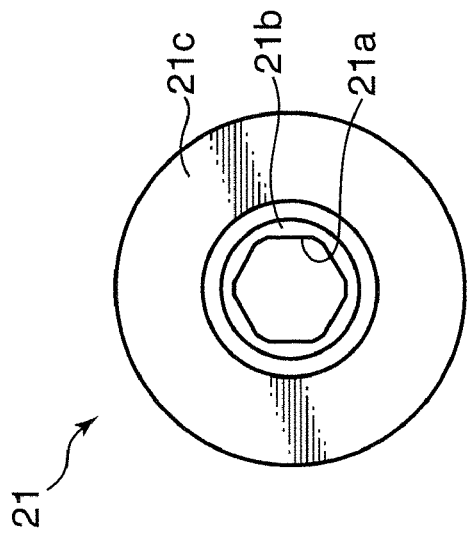

FIG. 3 is a diagram illustrating a structure of the bearing cover 21, in which FIG. 3A is an axial cross-sectional view similar to that in FIG. 1, and FIGS. 3B and 3C are side views in a direction perpendicular to the axis. The bearing cover 21 is made of a material such as resin and comprises a tubular part 21b having a hexagonal columnar hole 21a that corresponds to the support shafts 6a and 6b formed in hexagonal columnar shapes, and a flange part 21c extending radially outward from an end portion of the tubular part 21b positioned on an outer side of the roller tube 13. The flange part 21c is configured to prevent penetration of foreign particles into the bearings 11 and 12. The tubular part 21b has slits 21d formed at regular intervals in a circumferential direction from an end portion positioned on an inner side of the roller tube 13. In addition, a locking claw 21e is formed on an outer circumferential surface of an end portion positioned on the inner side of the roller tube 13. Therefore, when the tubular part 21b is fitted into the inner circumferential part of the bearing 11, the tubular part 21b separated by the slit 21d bends inward, and when the tubular part 21b separated by the slit 21d is completely fitted in, the locking claw 21e retains the bearing 11, the tubular part 21b is restored, and the support shafts 6a and 6b become insertable.

Figure 4A:
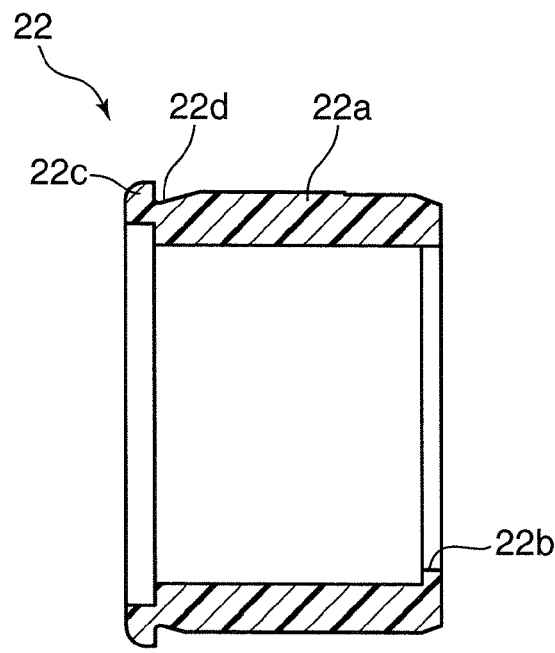
FIG. 4 is a diagram illustrating a structure of a side plate, in which A is an axial cross-sectional view and B is a side view in a direction perpendicular to the axis.
Figure 4B:
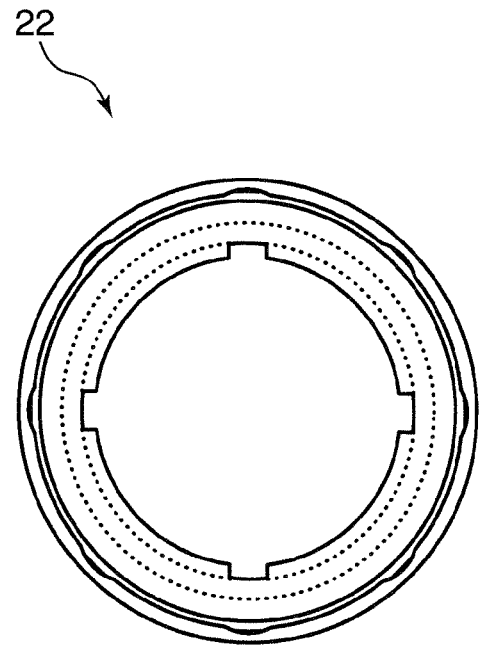

In addition, FIG. 4 is a diagram illustrating a structure of the side plate 22, in which FIG. 4A is an axial cross-sectional view similar to that in FIG. 1, and FIG. 4B is a side view in a direction perpendicular to the axis. The side plate 22 is also made of a material such as resin, and comprises a tubular part 22a into which the bearing 11 is fitted, a locking claw 22b extending radially inward from an end portion of the tubular part 22a positioned on an inner side of the roller tube 13, and a locking claw 22c extending radially outward from an end portion of the tubular part 22a positioned on an outer side of the roller tube 13. The locking claw 22c is formed in a flange shape. In the tubular part 22a, a gradual V-groove 22d is engraved into a base end of the locking claw 22c, and an end on an inner side is chamfered to form a guide slope surface 22e. In the tubular part 22a, a level difference 22f, into which is fitted an outer circumferential edge of the flange part 21c of the bearing cover 21, is formed on a radially inner side of an end portion positioned on an outer side of the roller tube 13. Therefore, upon fitting, the roller tube 13 is readily fitted by the guide slope surface 22e. Swaging as described earlier is performed toward the V-groove 22d in a state where an end of the roller tube 13 abuts the locking claw 22c. Once swaging is performed, the bearing 11 provided on the inner circumferential side of the tubular part 22a is retained between the tubular part 22a and the locking claw 22b. Moreover, at the pair of left and right side plates 22, while one more bearing 12 described below is provided at the side plate of the side of the support shaft 6b with an increased load, only the bearing 11 is provided at the side plate of the side of the support shaft 6a whose load is small, and a tubular spacer 23 is interposed in a gap that corresponds to the bearing 12 in the tubular part 22a.

The support shaft 6b is a hexagonal columnar slide shaft capable of sliding in an axial direction in a hole 21a of the tubular part 21b. A spring 24 that pushes back the support shaft 6b is provided on an inner side end of the support shaft 6b. The spring 24 is covered by a spring cover 25, whereby the spring 24 is supported by the bearing 12 via the spring cover 25. Therefore, in the motorized roller 1 assembled as will be described later, the opposite support shaft 6a is inserted into a hexagonal hole of the conveyor frame 5 in a state where the support shaft 6b is depressed, thereby causing the support shaft 6b to also face a corresponding hexagonal hole of the conveyor frame 5. The support shaft 6b projects into the hole to mount the motorized roller 1 to the conveyor frame 5.

On the other hand, the support shaft 6a is formed hollow and an electric wire 27 is drawn into the support shaft 6a via a protective tube 26. The electric wire 27 is made up or one or more power lines for supplying power to the motor 15 as well as signal lines when necessary. As for the power line, for example, two lines respectively + and − are provided in a case of direct current, one + line is provided in a case where the conveyor frame 5 is used as a GND line from the support shaft 6a or the roller tube 13, and three lines are provided in a case of three-phase alternating current. In addition, a control signal line, a sensor signal line, or the like is used as the signal line.

Furthermore, the internal frame 14 is fixed to the support shaft 6a by a screw 28. As described above, the motor 15 and the reduction mechanism 16 are mounted on the internal frame 14. The reduction mechanism 16 comprises a two-stage planetary gear and the like. Output from the reduction mechanism 16 is outputted from the bearing 29 fixed to the internal frame 14 and inputted to the power transmission mechanism 17.

It should be noted that the power transmission mechanism 17 comprises a first member 33 that receives torque from the motor 15, a second member 34 fitted into the first member 33, a bolt 35 that screws and presses the second member 34 to the first member 33 on the axis of the roller tube 13, and a double-sided tape 37 laid on an outer circumferential surface of the first member 33. In addition, the torque is transmitted to the first member 33 via an interposed member 32 that covers a spline hub 31 fitted into a spline shaft 30 that is an output shaft of the bearing 29. Furthermore, the double-sided tape 37 is attached to an outer circumferential surface of a rubber damper 36 after the rubber damper 36 is overlaid on the outer circumferential surface of the first member 33.

Figure 5:
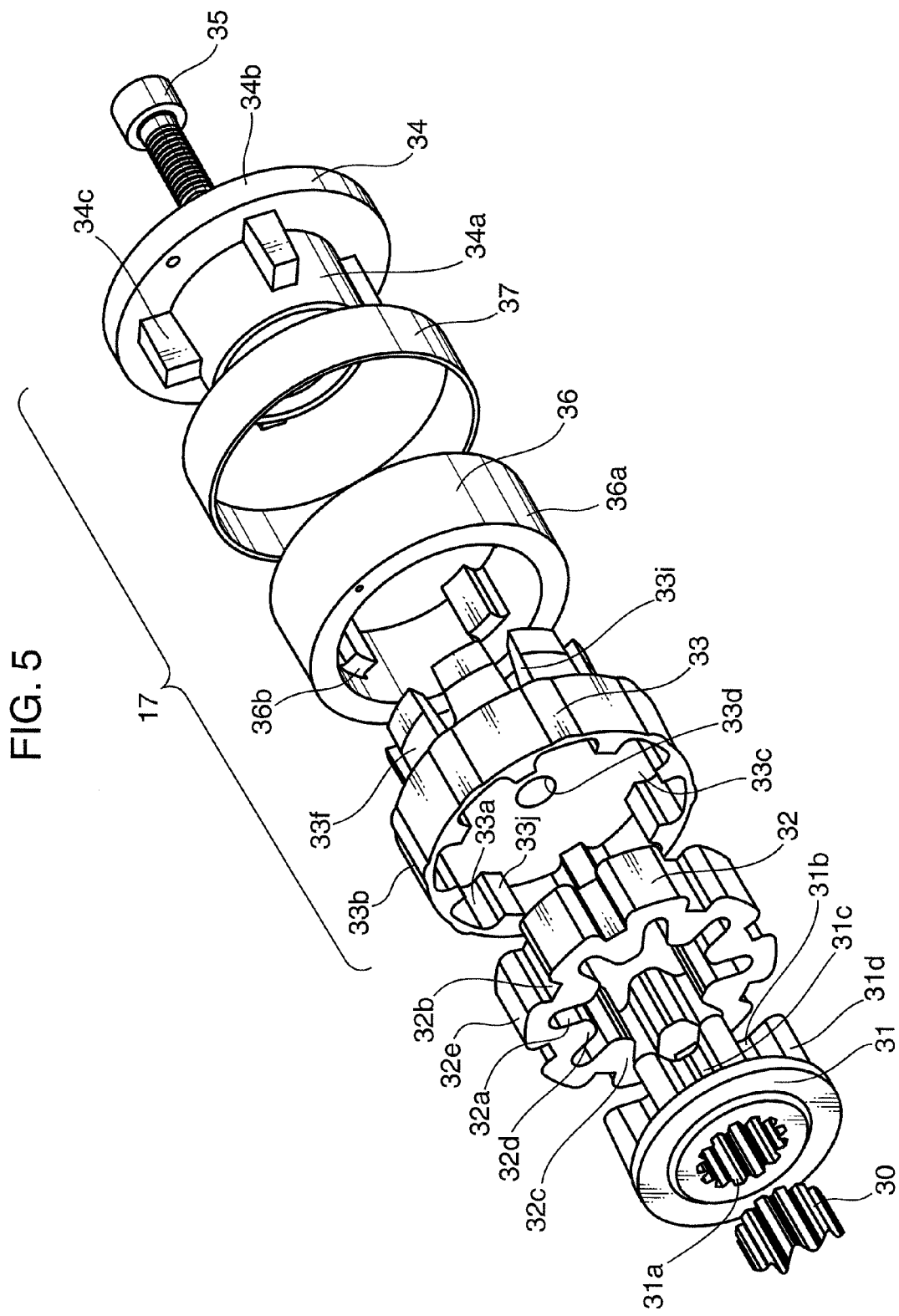
FIG. 5 is an exploded perspective view of a vicinity of a power transmission mechanism.
Figure 7A:
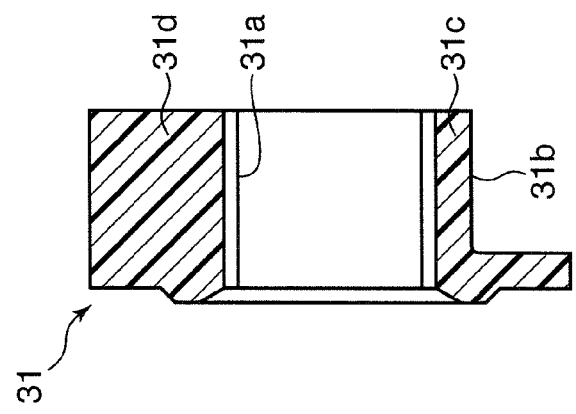
FIG. 7 is a diagram illustrating a structure of a spline hub, in which A is an axial cross-sectional view, and B and C are side views in a direction perpendicular to the axis.
Figure 7B:
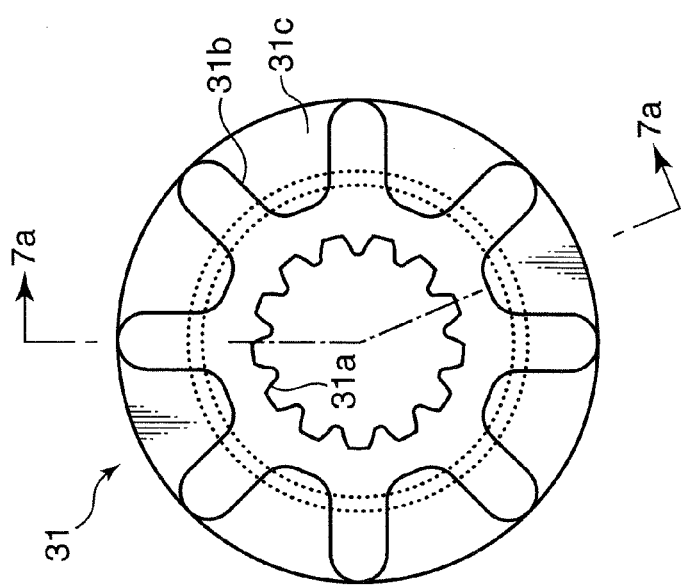
Figure 7C:
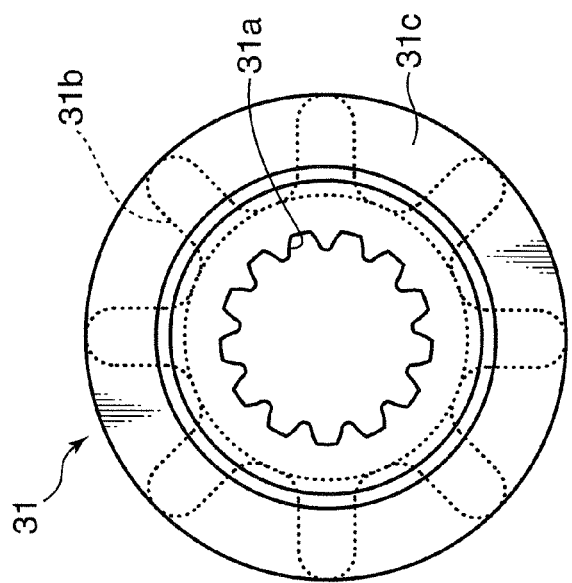

FIG. 5 is an exploded perspective view of a vicinity of the power transmission mechanism 17, and FIG. 6 is a cross-sectional view illustrating an enlargement of the power transmission mechanism 17. In addition, FIG. 7 is a diagram illustrating a structure of the spline hub 31. FIGS. 6A and 7A are axial cross-sectional views similar to FIG. 1, and FIGS. 6B, 7B, and 7C are side views in a direction perpendicular to the axis. Moreover, FIG. 7 and subsequent drawings include diagrams having nonlinear cross-sectional lines in order to clarify a larger number of portions in the same manner as FIG. 1, in which case a portion constituting a cross section of FIG. 1 is indicated by a cross-sectional line inserted into each diagram. The spline hub 31 comprises a tubular body 31c having a groove 31a which is provided at an inner circumference and into which the spline shaft 30 is to be fitted, as well as grooves 31b provided at regular intervals (in FIG. 6, eight) in a circumferential direction at an outer circumference or, in other words, protrusions 31d. The spline hub 31 is made of, for example, sintered alloy SMF 5040.

Figure 8A:
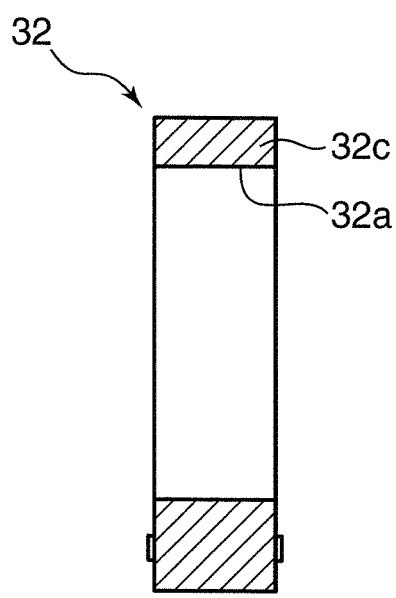
FIG. 8 is a diagram illustrating a structure of an interposed member, in which A is an axial cross-sectional view and B is a side view in a direction perpendicular to the axis.
Figure 8B:
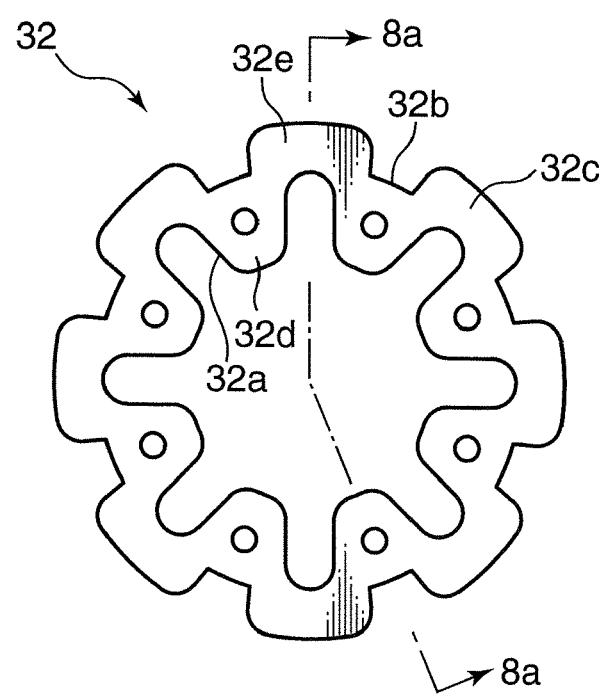

FIG. 8 is a diagram illustrating a structure of the interposed member 32 into which the spline hub 31 is fitted, in which FIG. 8A is an axial cross-sectional view similar to that in FIG. 1, and FIG. 8B is a side view in a direction perpendicular to the axis. The interposed member 32 is made of, for example NBR (nitrile rubber) that is a molded rubber article and is overlaid on the spline hub 31 for buffering. The interposed member 32 comprises a tubular body 32c having grooves 32a and 32b provided at inner and outer circumferences or, in other words, protrusions 32d and 32e. The groove 32a and the protrusion 32d on the inner circumferential side correspond to the protrusion 31d and the groove 31b of the spline hub 31, and the groove 32b and the protrusion 32e on the outer circumferential side are in the same phase as the protrusion 32d and the groove 32a on the inner circumferential side. The use of the spline hub 31 and the interposed member 32 enables flexible centering and shock absorbing with respect to shaft wobble or the like of the roller tube 13 due to load, prevention of damage to gears of the reduction mechanism 16, and reduction of noise.

Figure 9C:
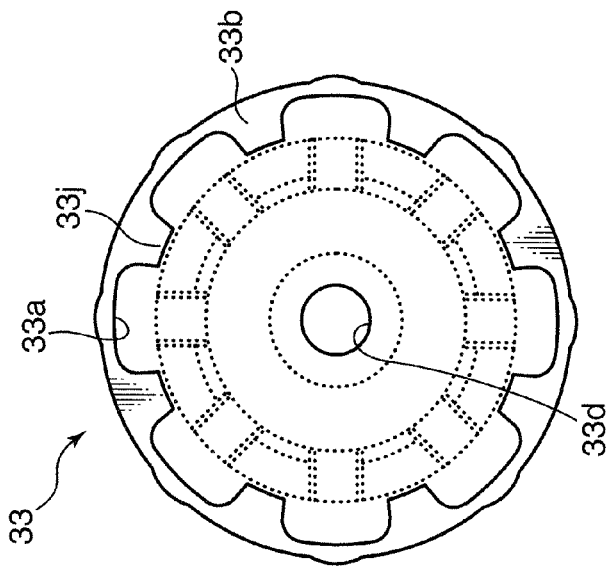
FIG. 9 is a diagram illustrating a structure of a first member, in which A is an axial cross-sectional view, and B and C are side views in a direction perpendicular to the axis.
Figure 9B:
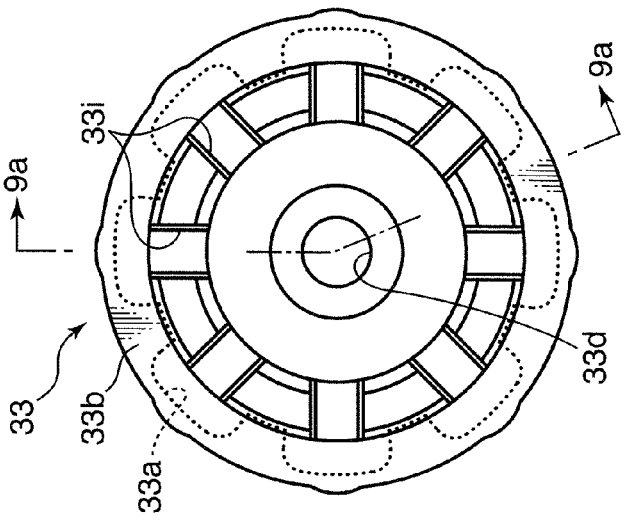
Figure 9A:
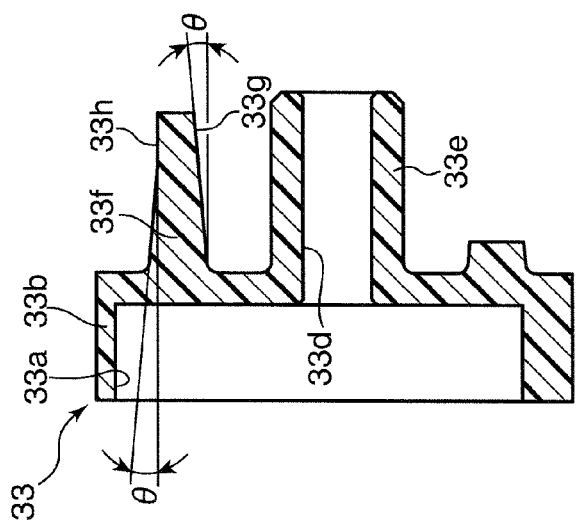

On the other hand, FIG. 9 is a diagram illustrating a structure of the first member 33, in which FIG. 9A is an axial cross-sectional view similar to that in FIG. 1, and FIGS. 9B and 9C are side views in a direction perpendicular to the axis. The first member 33 comprises a first tubular part 33b having, on an inner circumferential surface, a protrusion 33j and a groove 33a which respectively correspond to the groove 32b and the protrusion 32e of the interposed member 32, an end plate 33c that blocks an end of the first tubular part 33b, a second tubular part 33e which is erected at a central portion of the end plate 33c and which has an insertion hole 33d into which the bolt 35 is centrally inserted, and a third tubular part 33f arranged concentrically with respect to the second tubular part 33e. The first member 33 is made of a molded resin article. The second tubular part 33e has, on an inner circumferential side and an outer circumferential side thereof, tapered surfaces 33g and 33h with an inclination angle θ that is, for example, 5 degrees (having a wedge-shaped axial cross-section), and slits 33i extending axially at positions at regular circumferential intervals.

Figure 10A:
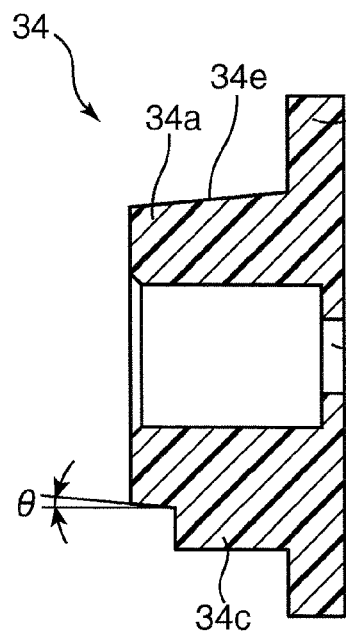
FIG. 10 is a diagram illustrating a structure of a second member, in which A is an axial cross-sectional view, and B and C are side views in a direction perpendicular to the axis.
Figure 10B:
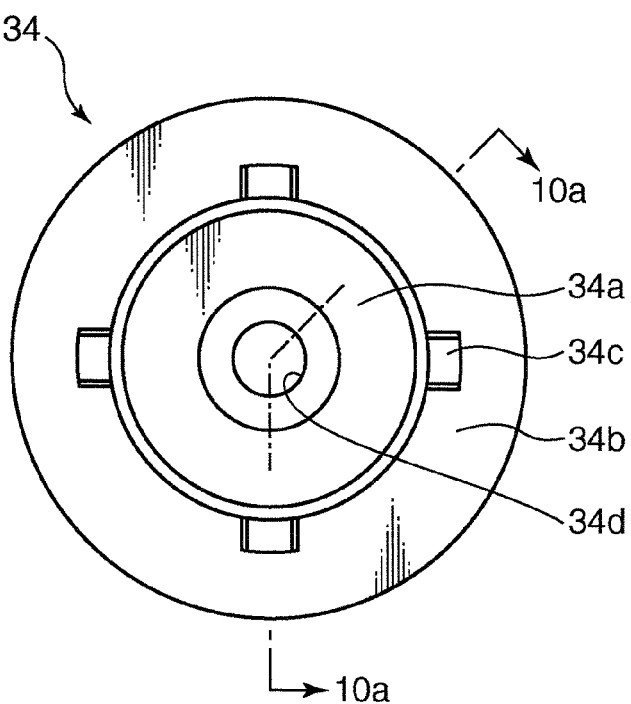
Figure 10C:
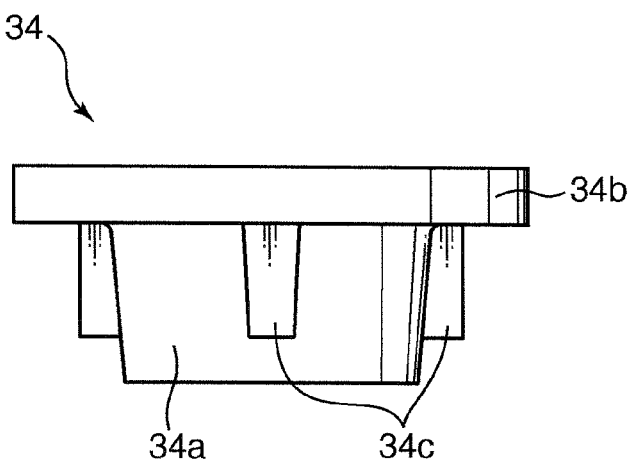

In addition, FIG. 10 is a diagram illustrating a structure of the second member 34, in which FIG. 10A is an axial cross-sectional view similar to that in FIG. 1, and FIGS. 10B and 10C are side views in a direction perpendicular to the axis. The second member 34 comprises an end plate 34b on a tubular part 34a that fits in between the second tubular part 33e and the third tubular part 33f of the first member 33, and protrusions 34c which are provided on an outer circumferential surface of the tubular part 34a and which fit into every other slit 33i. The second member 34 is made of a molded resin article. A hole 34d into which the bolt 35 is inserted is formed on the end plate 34b. In addition, the outer circumferential surface of the tubular part 34a has a tapered surface 34e with an inclination angle θ that is, for example, 5 degrees.

Figure 11A:
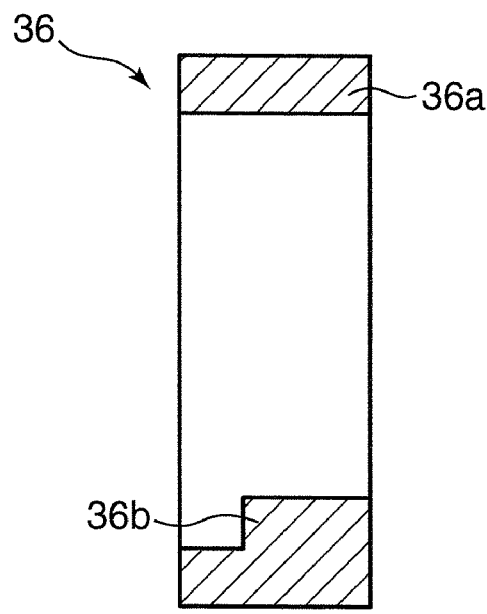
FIG. 11 is a diagram illustrating a structure of a rubber damper, in which A is an axial cross-sectional view and B is a side view in a direction perpendicular to the axis.
Figure 11B:
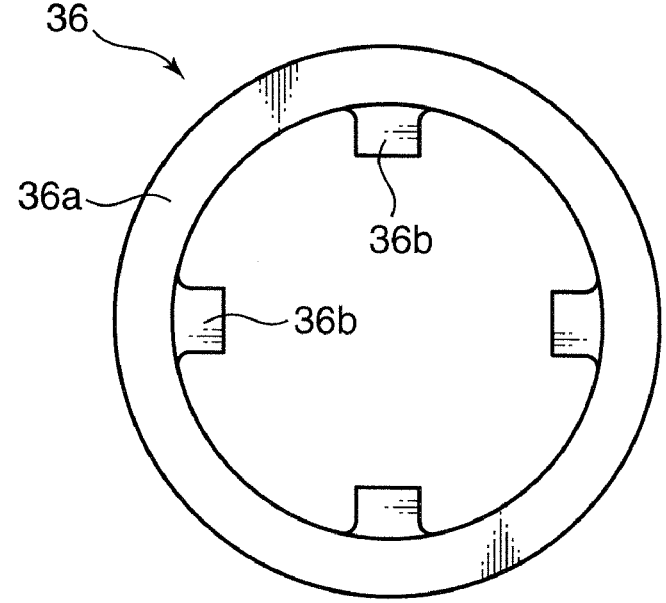

Furthermore, FIG. 11 is a diagram illustrating a structure of the rubber damper 36, in which FIG. 11A is an axial cross-sectional view similar to that in FIG. 1, and FIG. 11B is a side view in a direction perpendicular to the axis. The rubber damper 36 comprises protrusions 36b each of which fits into every other slit 33i and which are provided on an inner circumferential surface of a tubular part 36a that fits into the outer circumferential surface of the third tubular part 33f of the first member 33. The rubber damper 36 is made of NBR (nitrile rubber) to provide buffering in the same manner as the interposed member 32.

Upon assembly, first, the rubber damper 36 is fitted into the first member 33 so that the protrusions 36b of the rubber damper 36 conforms to the slits 33i, and the second member 34 is fitted into the first member 33 so that the protrusions 34c of the second member 34 conforms to other slits 33i (which differ from the protrusions 36b of the rubber damper 36). Next, the integrated first and second members 33 and 34 and the rubber damper 36 are overlaid on the interposed member 32 and the spline hub 31 assembled with each other, and are screwed to the spline shaft 30 by the bolt 35. Consequently, the tapered surface 34e of the tubular part 34a presses the tapered surface 33g of the second tubular part 33e radially outward to expand the diameter of the tubular part 34a. Accordingly, the rubber damper 36 is also pressed radially outward and the diameter of the rubber damper 36 expands.

Here, it should be noted that the double-sided tape 37 is attached to the outer circumferential surface of the rubber damper 36 and the adhesive layer of the double-sided tape 37 is made of a pressure-sensitive adhesive layer. Therefore, in a state where the power transmission mechanism 17 comprising the spline hub 31, the interposed member 32, the first member 33, the second member 34, the rubber damper 36, and the double-sided tape 37 is temporarily jointed by the bolt 35 to the internal frame 14 mounted with the motor 15, the reduction mechanism 16, and the bearings, the cylindrical roller tube 13 is overlaid, the bolt 35 is finally tightened, and both ends of the roller tube 13 are swaged toward the V-groove 22d of the side plate 22. The motorized roller 1 is completed in this manner.

Therefore, the adhesive force of the pressure-sensitive adhesive layer of the double-sided tape 37 is exerted upon the final tightening of the bolt 35. For example, 6930B manufactured by ThreeBond Co., Ltd. can be used as the pressure-sensitive adhesive layer. The pressure-sensitive adhesive layer can prevent a positional displacement (slip) between the spline hub 31 and the roller tube 13 due to aging or the like. In addition, when using coupling by the adhesive layer, the use of the pressure-sensitive adhesive layer keeps adhesive force from being exerted until the power transmission mechanism 17 is housed in the roller tube 13 and the second member 34 is screwed to the first member 33. Therefore, assembly can be easily performed and the outer circumferential surface of the rubber damper 36 on which the pressure-sensitive adhesive layer is laid can be formed to the full extent of an inner diameter of the roller tube 13 so as to reliably prevent the positional displacement (slip).

The length of the roller tube 13 is to be appropriately selected according to the width of the roller conveyor device 2. Since the side of the support shaft 6a has another bearing 29 provided at the internal frame 14 fixed to the conveyor frame 5 in addition to the bearing 11, as described above, the side of the support shaft 6b is provided with two bearings 11 and 12.

In addition, it should be noted that the power transmission mechanism 17 has the reduction mechanism 16 between the motor 15 and the first member 33. Therefore, by using a planetary gear or the like for the reduction mechanism 16, a large reduction ratio can be obtained and a large torque can be transmitted.

Furthermore, it should be noted that in the power transmission mechanism 17, the double-sided tape 37 is laid on the outer circumferential surface of the first member 33 after the rubber damper layer 36 is laminated. By interposing the rubber damper layer 36, shaft displacement between the roller tube 13, the motor 15, and the power transmission mechanism 17, and insufficient roundness of the roller tube 13 can be compensated, and shock absorption and vibration reduction can be achieved. In addition, by interposing the rubber damper layer 36, the inner circumferential surface of the roller tube 13 is uniformly pressed by the rubber damper layer 36 even when the plurality of slits 33i is formed on the third tubular part 33f (circumferential wall) of the first member 33 whose diameter is to be expanded. Therefore, the formation of the slits 33i enable the first member 33 made of a molded resin article to expand more easily.

In this case, with the first member 33 and the second member 34 that are fitted to each other, either one of the members may be positioned on the outer side to press the rubber damper layer 36. Furthermore, forming the tapered surfaces 33g and 34e on at least one of the members is to suffice.

While the present description discloses techniques of various modes as described above, principal among such techniques will be summarized below.

A roller conveyor motorized roller according to a mode of the present invention comprises a roller tube pivotally supported by a pair of support shafts erected so as to oppose each other from a pair of conveyor frames, a motor fixed to one of the support shafts in the roller tube, and a power transmission mechanism which is provided in the roller tube and which transmits torque of the motor to the roller tube, wherein: the power transmission mechanism includes first and second members which are respectively formed in a closed-bottom cylindrical shape and one of which is fitted into the other of which, a screwing member for axially pressing the second member against the first member that receives torque from an output shaft of the motor, and a pressure-sensitive adhesive layer laid on an outer circumferential surface of a circumferential wall of the member to be positioned on an outer circumferential side among the first and second members one of which is fitted into the other of which; at least one of surfaces, which face each other, of circumferential walls of the first and second members is formed in a tapered shape (having a wedge-shaped cross-section); the circumferential wall where the pressure-sensitive adhesive layer is laid is formed so as to be expandable in diameter; the diameter of the circumferential wall pressed by the tapered surface due to pressing by the screwing member expands; and an adhesive force of the pressure-sensitive adhesive layer is exerted to adhere the outer circumferential surface of the first member or the second member and an inner circumferential surface of the roller tube to each other.

Consequently, a positional displacement (slip) due to aging or the like can be prevented by using adhesion provided by an adhesive layer when coupling a power transmission mechanism in a roller tube with the roller tube. In addition, since the use of the pressure-sensitive adhesive layer when using such coupling by the adhesive layer keeps adhesive force from being exerted until the power transmission mechanism is housed in the roller tube and the second member is screwed to the first member, assembly can be easily performed and the outer circumferential surface of the first or second member on which the pressure-sensitive adhesive layer is laid can be formed to the full extent of an inner diameter of the roller tube so as to reliably prevent the positional displacement (slip).

In a preferred mode, the power transmission mechanism comprises a reduction mechanism provided between the motor and the first member.

A roller conveyor motorized roller according to yet another mode of the present invention comprises the power transmission mechanism, wherein on the outer circumferential surface of the first or second member on which the pressure-sensitive adhesive layer is laid, a rubber damper layer is first laminated and then the pressure-sensitive adhesive layer is laid.

According to the configuration described above, by interposing the rubber damper layer, shaft displacement between the roller tube, and the motor and the power transmission mechanism, and insufficient roundness of the roller tube can be compensated. At the same time, by interposing the rubber damper layer, the inner circumferential surface of the roller tube is uniformly pressed by the rubber damper layer even when a plurality of slits is formed on the circumferential wall of the first or the second member whose diameter is to be expanded. Therefore, the formation of the slits enables the first and second members made of resin or the like to expand more easily.

The present invention is capable of preventing a positional displacement (slip) due to aging or the like by using adhesion provided by an adhesive layer when coupling a power transmission mechanism in a roller tube with the roller tube, and is preferable as a roller conveyor motorized roller.

The invention claimed is:

1. A roller conveyor motorized roller, comprising:
   a roller tube pivotally supported by a pair of support shafts erected so as to oppose each other from a pair of conveyor frames;
   a motor fixed to one of the support shafts in the roller tube; and
   a power transmission mechanism which is provided in the roller tube and which transmits torque of the motor to the roller tube,
   the power transmission mechanism including:
   first and second members which are respectively formed in a closed-bottom cylindrical shape and one of which is fitted into the other of which;
   a screwing member for axially pressing the second member against the first member that receives torque from an output shaft of the motor; and
   a pressure-sensitive adhesive layer laid on an outer circumferential surface of a circumferential wall of the member to be positioned on an outer circumferential side among the first and second members one of which is fitted into the other of which, and
   the power transmission mechanism being configured such that at least one of surfaces, which face each other, of circumferential walls of the first and second members is formed in a tapered shape, the circumferential wall where the pressure-sensitive adhesive layer is laid is formed so as to be expandable in diameter, the diameter of the circumferential wall pressed by the tapered surface due to pressing by the screwing member expands, and an adhesive force of the pressure-sensitive adhesive layer is exerted to adhere the outer circumferential surface of the first member or the second member and an inner circumferential surface of the roller tube to each other.

2. The roller conveyor motorized roller according to claim 1, wherein the power transmission mechanism has a reduction mechanism between the motor and the first member.

3. The roller conveyor motorized roller according to claim 1, wherein on the outer circumferential surface of the first or second member on which the pressure-sensitive adhesive layer is laid in the power transmission mechanism, a rubber damper layer is first laminated and then the pressure-sensitive adhesive layer is laid.

4. A roller conveyor device that uses the roller conveyor motorized roller according to claim 1.

* * * * *